(12) United States Patent
Huang

(10) Patent No.: US 11,403,365 B2
(45) Date of Patent: Aug. 2, 2022

(54) METHOD AND APPARATUS FOR STORING WEBPAGE ACCESS RECORDS

(71) Applicant: TENCENT TECHNOLOGY (SHENZHEN) COMPANY LIMITED, Shenzhen (IN)

(72) Inventor: Fengxiang Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1245 days.

(21) Appl. No.: 14/632,671

(22) Filed: Feb. 26, 2015

(65) Prior Publication Data

US 2015/0169601 A1    Jun. 18, 2015

Related U.S. Application Data

(63) Continuation of application No. PCT/CN2013/085793, filed on Oct. 23, 2013.

(30) Foreign Application Priority Data

Nov. 1, 2012 (CN) .......................... 201210429621.2

(51) Int. Cl.
*G06F 16/958* (2019.01)

(52) U.S. Cl.
CPC .................................. *G06F 16/958* (2019.01)

(58) Field of Classification Search
CPC ............................ G06F 17/3089; G06F 16/958
See application file for complete search history.

(56) References Cited

U.S. PATENT DOCUMENTS 6,182,122 B1 * 1/2001 Berstis .............. G06F 17/30902
  707/E17.12
8,838,602 B1 * 9/2014 Zhang ..................... G06F 16/90
  707/737

(Continued)

FOREIGN PATENT DOCUMENTS

CN         10130227 A     9/2007
CN        101706827 A     5/2010

(Continued)

OTHER PUBLICATIONS

CN Office Action dated Apr. 5, 2017 re: Application No. 2012104296212; pp. 1-7; citing: CN 101714161 A, CN 101706827 A and CN 101030227 A.

(Continued)

*Primary Examiner* — Son T Hoang
(74) *Attorney, Agent, or Firm* — Sughrue Mion, PLLC

(57) ABSTRACT

A method for storing webpage access records includes: obtaining an information entropy of each webpage accessed by a user, the information entropy being determined according to location of each webpage in a website and historical access number of the user for each webpage; keeping access records of webpages whose information entropies are greater than a preset threshold value. When a user accesses webpages, an information entropy of each webpage accessed by the user can be determined according to location of each accessed webpage in a website and historical access number of the user for each accessed webpage. Thus, webpage history records can be stored according to size of information entropies, so that the user is able to quickly navigate to a corresponding page when the user needs to access the same webpage again, thereby improving webpage access efficiency.

7 Claims, 2 Drawing Sheets

---

S301 according to a URL of the webpage, determining that the webpage is a N-level page of the website; N being an integer greater than or equal to 1

S302 determining that an initial entropy of the webpage is a preset N-level initial entropy; the N-level initial entropy is greater than a (N+1)-level initial entropy

(56) References Cited

U.S. PATENT DOCUMENTS

| | | | | |
|---|---|---|---|---|
| 2002/0147895 A1* | 10/2002 | Glance | ................ | G06F 16/9574 |
| | | | | 711/158 |
| 2006/0069746 A1* | 3/2006 | Davis | ................ | H04L 67/2842 |
| | | | | 709/218 |
| 2009/0327270 A1* | 12/2009 | Teevan | ................ | G06F 16/9535 |
| | | | | 707/999.005 |
| 2012/0290790 A1* | 11/2012 | Meirosu | ................ | G06F 12/121 |
| | | | | 711/118 |
| 2014/0068407 A1* | 3/2014 | Suh | ................ | G06F 16/94 |
| | | | | 715/234 |

FOREIGN PATENT DOCUMENTS

| | | |
|---|---|---|
| CN | 101714161 A | 5/2010 |
| WO | 2004051504 A2 | 6/2004 |
| WO | 2010083748 A1 | 7/2010 |
| WO | 2011110062 A1 | 9/2011 |

OTHER PUBLICATIONS

International Preliminary Report on Patentability and Written Opinion dated May 14, 2015 re: Application No. PCT/CN2013/085793; pp. 1-9.

International Search Report dated Jan. 30, 2014 re: Application No. PCT/CN2013/085793; citing: WO 2004/051504 A2, WO 2010/083748 A1 and WO 2011/110062 A1.

* cited by examiner

METHOD AND APPARATUS FOR STORING WEBPAGE ACCESS RECORDS

CROSS-REFERENCES TO RELATED APPLICATIONS

This application is a continuation of International Application No. PCT/CN2013/085793, filed on Oct. 23, 2013, which claims priority to Chinese patent application No. 201210429621.2, filed on Nov. 1, 2012, the content of which are incorporated herein by reference in their entirety.

FIELD OF THE DISCLOSURE

The present disclosure relates to network technology, and more particularly to a method and apparatus for storing webpage access records.

BACKGROUND

With the continuous development and wide popularity of network technology, the network has entered into every aspect of people's daily work life. Users can access network anytime and anywhere through different forms of terminals. The most common network behavior of the users includes obtaining required information through accessing various kinds of webpages.

Usually, in order to save user's traffic and improve browsing efficiency, an existing webpage access tool such as a browser, etc., according to a user's browsing sequence, stores in turn webpages accessed by the user as historical access records, thus, when the user needs to access a previously browsed webpage again, the user can directly call out this webpage from the historical access records so as to improve access efficiency. However, whenever the user browses to a deep webpage of a website, the user needs to perform multiple fallback operations sequentially or query a corresponding link from the historical access records before returning to a home page of the website, which greatly reduces webpage access efficiency.

SUMMARY

One embodiment of the present disclosure provides a method for storing webpage access records, which can improves webpage access efficiency. The technical solution is as follows:

A method for storing webpage access records, includes:
detecting a location of each webpage in a website and historical access number of a user accessing each webpage;
determining an information entropy of each webpage accessed by the user according to the location of each webpage in the website and the historical access number of the user accessing each webpage;
comparing the information entropy of each webpage with a preset threshold value; and
keeping access records of webpages whose information entropies are greater than the preset threshold value.

An apparatus for storing webpage access records, includes:
an information entropy obtaining unit, configured to determine an information entropy of each webpage accessed by a user according to location of each webpage in a website and historical access number of the user for each webpage;
a cache unit configured to keep access records of webpages whose information entropies are greater than a preset threshold value.

A non-transitory computer-readable storage medium includes a set of instructions for performing a method for storing webpage access records, the set of instructions to direct at least one processor to perform acts of: obtaining an information entropy of each webpage accessed by a user; determining whether a number of webpages accessed by the user reaches a preset number or a cache of the webpages accessed by the user reaches a preset capacity; if the number of the webpages accessed by the user reaches the preset number or the cache of the webpages accessed by the user reaches the preset capacity, keeping access records of webpages whose information entropies are greater than a preset threshold value; if the number of the webpages accessed by the user does not reaches the preset number and the cache of the webpages accessed by the user does not reaches the preset capacity, keeping all access records of the webpages accessed by the user.

In one embodiment of the present disclosure, when a user accesses webpages, an information entropy of each webpage accessed by the user can be determined according to location of each accessed webpage in a website and historical access number of the user for each accessed webpage. Thus, webpage history records can be stored according to size of information entropies, so that the user is able to quickly navigate to a corresponding page when the user needs to access the same webpage again, thereby improving webpage access efficiency.

DETAILED DESCRIPTION

For simplicity and illustrative purposes, the present disclosure is described by referring mainly to embodiments thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

In one embodiment of the present disclosure, when a user accesses webpages, an information entropy of each webpage accessed by the user can be determined according to location of each accessed webpage in a website and historical access number of the user for each accessed webpage. Thus, webpage history records can be stored according to size of information entropies, so that the user is able to quickly navigate to a corresponding page when the user needs to access the same webpage again, thereby improving webpage access efficiency.

Figure 1:
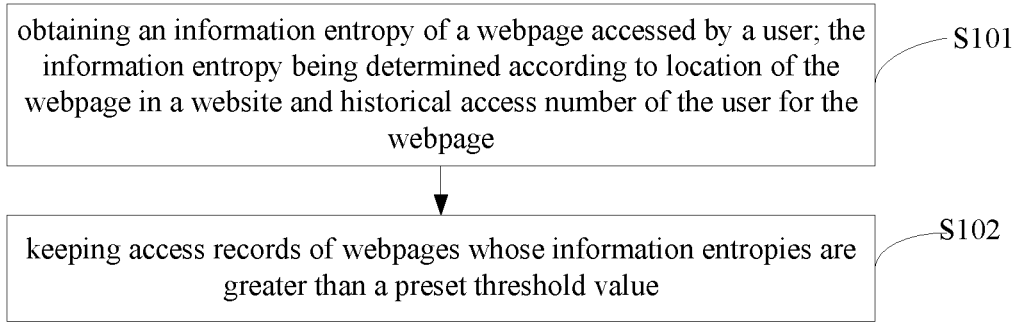
FIG. 1 is an implementation flow chart of a method for storing webpage access records according to an embodiment of the present disclosure.

FIG. 1 shows an implementation flow chart of a method for storing webpage access records according to an embodiment of the present disclosure, and details are as follows:

Step S101: obtaining an information entropy of a webpage accessed by a user; the information entropy being determined according to location of the webpage in a website and historical access number of the user for the webpage.

In this embodiment, when the user browses webpages through a webpage access tool, during the process that the user accesses webpages, an information entropy of each webpage accessed by the user can be obtained. The information entropy can be determined according to location of each webpage in the website and historical access number of the user for each webpage. Every time the user accesses the same webpage again, the information entropy of this webpage can be obtained through adding an information entropy generated by the user's current access to the webpage and the previous information entropy of the webpage.

For location of each webpage in each website, since the concept of information entropy is considered at the time of designing each website, thus, the richest, freshest and most valuable information is shown in a one-level page of a website, with the deepening of the website hierarchy, the amount of information in each level page is decreased progressively, until reaching the deepest level page of the website. For example, for a portal website, its homepage (one-level page) covers all kinds of information and its news channel as a two-level page only covers information related to all kinds of news; next, amount of information in three-level page "domestic news" is further reduced. Thus, through determining location of a webpage in a website, a page level of the webpage in the website can be determined, and then the amount of information in this webpage can be estimated.

For the historical access number of the user for the webpage, during the process that the user accesses webpages, the user usually selects an interested category in the one-level page and opens a two-level page which displays this category; after completion of browsing, the user can return to the one-level page through "fallback" operation and continue to select other category to browse. In the above process, since the one-level page covers the richest information and the user accesses to the one-level page many times, thus, the amount of information in this webpage can also be estimated via the historical access number of the user for the webpage.

A specific implementation flow of determining an information entropy of a webpage according to location of the webpage in a website and historical access number of the user for the webpage will be described in details in following embodiments and will not be repeated here.

Step S102: keeping access records of webpages whose information entropies are greater than a preset threshold value.

In this embodiment, according to size of information entropy of each webpage which is currently accessed by the user obtained in the step S101, access records of webpages whose information entropies are greater than a preset threshold value are stored in a cache. Specifically, an access record includes a uniform resource locator (URL) of each webpage. Further, the access records can also include other related information of the webpage such as cached content and access time, etc.

When the user performs accessing, since the deepest level page of a website, such as a content page of some specific news, covers the minimum amount of information, and the user normally browses this page just once, thus, in combination with the user's actual browsing situation, there is no need to keep the access record of this webpage; the information entropy of this webpage which can be determined through the step S101, is also the smallest, thus, in the method for storing webpage access records provided in this embodiment of the present disclosure, the access record of this webpage is not kept.

Through implementing the above solution, when a browsing sequence is "two-level page→three-level page 1→three-level page 2", and the user needs to return to the two-level page through "fallback" operation after the user has browsed the three-level page 2, since the access record of the three-level page 1 is not kept, thus, the user can directly returns to the two-level page from the three-level page 2 through single "fallback" operation, thereby greatly improving webpage access efficiency.

Figure 2:
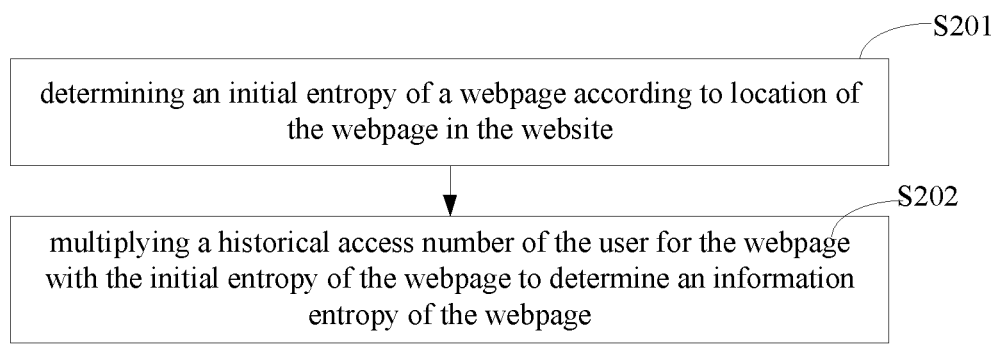
FIG. 2 is a specific implementation flow chart of a step S101 of the method for storing webpage access records according to the embodiment of the present disclosure.

FIG. 2 shows a specific implementation flow chart of the step S101 of the method for storing webpage access records according to the embodiment of the present disclosure, and details are as follows:

Step S201: determining an initial entropy of a webpage according to location of the webpage in the website.

Figure 3:
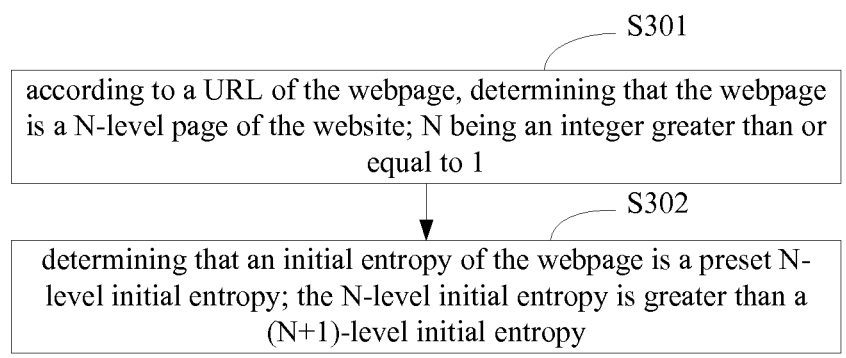
FIG. 3 is a specific implementation flow chart of a step S201 of the method for storing webpage access records according to the embodiment of the present disclosure.

As an embodiment of the present disclosure, as shown in FIG. 3, the location of the webpage in the website can be determined according to a uniform Resource Locator (URL) of the webpage, and this can specifically include:

Step S301: according to a URL of the webpage, determining that the webpage is a N-level page of the website; N being an integer greater than or equal to 1;

Usually, when a URL of a webpage is generated, the URL represents location of the webpage in the website. For example, a URL of a homepage of one portal website is "http://www.A.com"; accordingly, a URL of its news channel is "http://www.A.com/news". Thus, according to the URL of the webpage, it can be determined that the webpage is which level page of the website.

Step S302: determining that an initial entropy of the webpage is a preset N-level initial entropy; the N-level initial entropy is greater than a (N+1)-level initial entropy.

Since amount of information in each webpage of each website is decreased progressively with the deepening of the website hierarchy, thus, the amount of information in N-level page is certain to be greater than the amount of information in N+1-level page, then, the apparatus can preset an initial entropy of some level for each level page. For example, for one-level page, an initial entropy can be set to be 100; for two-level page, an initial entropy can be set to be 500, . . . , and so on.

As another embodiment of the present disclosure, location of a webpage which is currently accessed by the user in a website can also be determined according to the user's click depth in the website. For example, the user clicks a link in a homepage of a portal website, this link points to a two-level page of the website; then, the user clicks another link in the two-level page, and the another link points to a webpage which is regarded as a three-level page of the website, thereby determining location of the webpage in the web site.

Step S202: multiplying a historical access number of the user for the webpage with the initial entropy of the webpage to determine an information entropy of the webpage.

The historical access number is, by the end of the user's current access to the webpage, a number of access records for the webpage kept in the webpage access tool. Through multiplying the historical access number with the initial entropy of the webpage, the information entropy of the webpage can be eventually determined.

It should be noted, in the embodiment of the present disclosure, the method for determining information entropies of webpages includes but not limited to the manner of the embodiment shown in FIG. 2. For example, the information entropy can also be calculated by taking different weights for location of the webpage in the website and historical access number of the user for the webpage, and will not be defined here one by one.

Since when a number of webpages currently browsed by the user is small, if the user performs "fallback" operations or access record lookup operation, the user is able to quickly navigate to the page needed to be accessed again, thus, as one embodiment of the present disclosure, the step S102 specifically can be:

when a number of webpages accessed by the user reaches a preset number, keeping access records of webpages whose information entropies are greater than the preset threshold value.

That is, only when the number of webpages accessed by the user is large, performing filtering and caching the webpage access records via information entropies.

As another embodiment of the present disclosure, the step S102 also can be:

when cache of the webpages accessed by the user reaches a preset capacity, keeping access records of webpages whose information entropies are greater than the preset threshold value.

That is, determining current cache capacity; when the cache capacity is large, it shows that the user has accessed a large number of webpages, then performing filtering and caching the webpage access records via information entropies.

In one embodiment of the present disclosure, when a user accesses webpages, an information entropy of each webpage accessed by the user can be determined according to location of each accessed webpage in a website and historical access number of the user for each accessed webpage. Thus, webpage history records can be cached according to size of information entropies, so that the user is able to quickly navigate to a corresponding page when the user needs to access the same webpage again, this can avoid the problem that the access records are too long and take up too much storage space, and can greatly improve webpage access efficiency.

Figure 4:
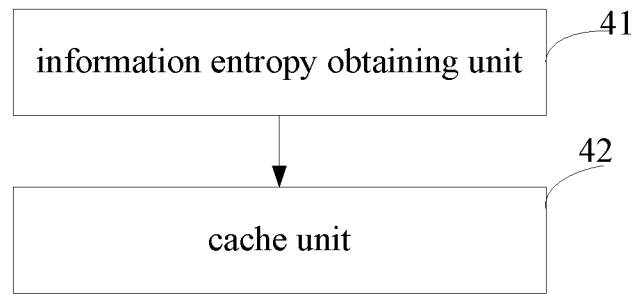
FIG. 4 is a block diagram of an apparatus for storing webpage access records according to an embodiment of the present disclosure.

FIG. 4 shows a block diagram of an apparatus for storing webpage access records according to an embodiment of the present disclosure. The apparatus can be located in a webpage access tool such as a browser, etc., and is configured to implement the method for storing webpage access records described in the embodiment shown in FIGS. 1-3 of the present disclosure. For convenience of description, only relevant parts of this embodiment are shown.

Referring to FIG. 4, the apparatus includes:

an information entropy obtaining unit 41, configured to obtain an information entropy of each webpage accessed by a user; the information entropy can be determined according to location of each webpage in a website and historical access number of the user for each webpage;

a cache unit 42 configured to keep access records of webpages whose information entropies are greater than a preset threshold value.

Figure 5:
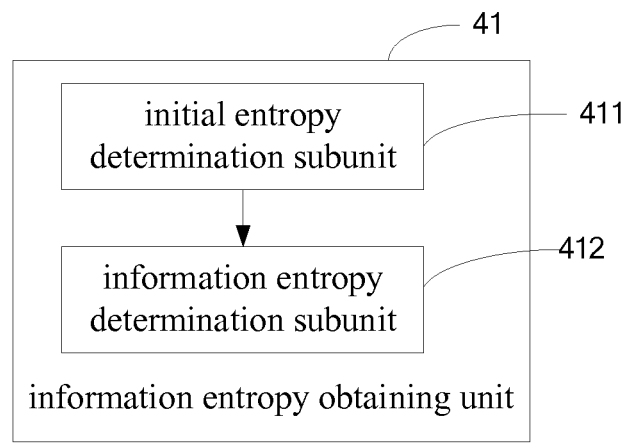
FIG. 5 is a block diagram of an apparatus for storing webpage access records according to another embodiment of the present disclosure.

As shown in FIG. 5, the information entropy obtaining unit 41 can include:

an initial entropy determination subunit 411 configured to determine an initial entropy of a webpage according to location of the webpage in the website;

an information entropy determination subunit 412 configured to multiply a historical access number of the user for the webpage with the initial entropy of the webpage to determine an information entropy of the webpage.

The initial entropy determination subunit 411 can include:

a first determination subunit configured to, according to a uniform Resource Locator (URL) of the webpage, determine that the webpage is a N-level page of the website; N is an integer greater than or equal to 1;

a second determination subunit configured to determine that the initial entropy of the webpage is a preset N-level initial entropy; the N-level initial entropy is greater than a (N+1)-level initial entropy.

The cache unit 42 is specifically configured to, when a number of webpages accessed by the user reaches a preset number, keep access records of webpages whose information entropies are greater than the preset threshold value.

Alternatively, the cache unit 42 is specifically configured to, when a cache of the webpages accessed by the user reaches a preset capacity, keep access records of webpages whose information entropies are greater than the preset threshold value.

In embodiments of the present disclosure, when a user accesses webpages, an information entropy of each webpage accessed by the user can be determined according to location of each accessed webpage in a website and historical access number of the user for each accessed webpage. Thus, webpage history records can be stored according to size of information entropies, so that the user is able to quickly navigate to a corresponding page when the user needs to access the same webpage again, this can avoid the problem that the access records are too long and take up too much storage space, and can greatly improve webpage access efficiency.

Figure 6:
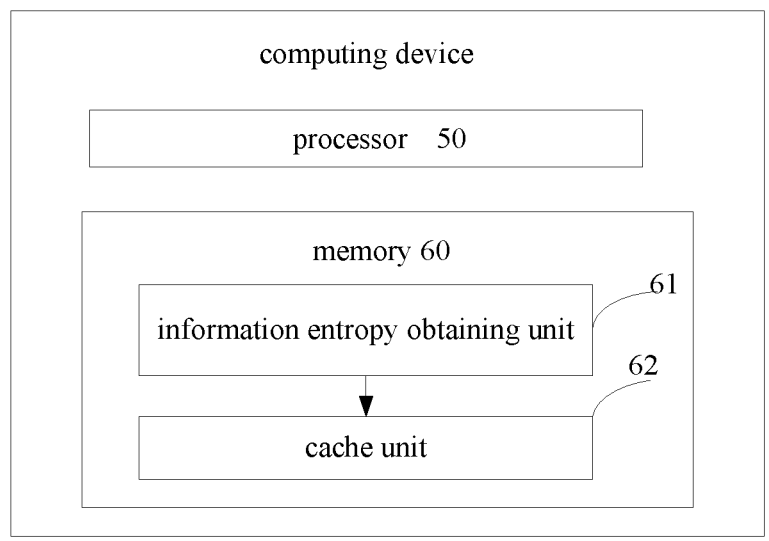
FIG. 6 is a block diagram of a computing device according to an embodiment of the present disclosure.

FIG. 6 is a schematic diagram illustrating an example structure of a computing device according to the present disclosure.

The above apparatus can run in a computing device shown in FIG. 6. As shown in FIG. 6, the computing device includes a CPU 50 and a memory 60. The CPU 50 and the memory 60 are connected with each other via an internal bus. The memory 60 stores units of machine readable instructions executable by the CPU 50, including an information entropy obtaining unit 61 and a cache unit 62. Functions of the information entropy obtaining unit 61 and the cache unit 62 are similar with the functions of the information entropy obtaining unit 41 and the cache unit 42 respectively. The functions may be implemented with the assistance of other modules, and may involve cooperation of multiple modules, e.g., may utilize processing functions of the CPU 60, may relay on the internal bus for data transmission, and etc.

The methods, units, apparatus and device described herein may be implemented by hardware, machine-readable instructions or a combination of hardware and machine-readable instructions. Machine-readable instructions used in the embodiments disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided to store instructions to cause a machine to execute a process as described according to embodiments herein. Specifically, a system or apparatus having a storage medium that stores machine-readable program codes for implementing functions of any of the above embodiments and that may cause the system or the apparatus (or CPU or MPU) read and execute the program codes stored in the storage medium.

In this situation, the program codes read from the storage medium may implement any one of the above embodiments, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. The program code may be downloaded from a server computer via a communication network.

It should be noted that, alternatively to the program codes being executed by a computer, at least part of the operations performed by the program codes may be implemented by an operation system running in a computer following instructions based on the program codes to implement any of the above embodiments.

In addition, the program codes implemented from a storage medium are written in a storage in an extension board inserted in the computer or in a storage in an extension unit connected to the computer. In this embodiment, a CPU in the extension board or the extension unit executes at least part of the operations according to the instructions based on the program codes to implement any of the above embodiments.

Although described specifically throughout the entirety of the instant disclosure, representative embodiments of the present disclosure have utility over a wide range of applications, and the above discussion is not intended and should not be construed to be limiting, but is offered as an illustrative discussion of aspects of the disclosure.

What has been described and illustrated herein is an embodiment along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method comprising:
    determining, by a user device during a process that a user accesses webpages, a hierarchy level of each webpage that is accessed by the user among a plurality of webpages in a website by parsing text of a uniform resource locator (URL), and determining a historical access number of times that the user has accessed the webpage;
    obtaining, by the user device during the process that the user accesses the webpages, as an initial entropy value of each webpage accessed by the user, a preset N-level initial entropy value according to the determined hierarchy level of the webpage, where an N-level initial entropy value is greater than an (N+1)-level initial entropy value, N being an integer greater than or equal to 1, the initial entropy value of the webpage in the website being determined based on a location of the webpage in the website that is indicated by a click depth of the user in the website;
    calculating, for each webpage, an information entropy value of the webpage by multiplying the historical access number of times that the user has accessed each webpage with the initial entropy value of the webpage;
    comparing, by the user device, the information entropy value of each webpage with a preset threshold value;
    caching, by the user device, historical access records of webpages whose information entropy values are greater than the preset threshold value, and deleting historical access records of webpages whose information entropy values are not greater than the preset threshold value from a cache of the user device; and
    performing a fallback operation to navigate through the website to a webpage whose information entropy value is greater than the preset threshold value from a webpage whose information entropy value is not greater than the preset threshold value in a single process.

2. The method of claim 1, wherein the historical access records are cached upon a condition that a number of webpages accessed by the user reaches a preset number.

3. The method of claim 1, wherein the historical access records are cached upon a condition that a cache of webpages accessed by the user reaches a preset capacity.

4. An apparatus comprising:
    at least one memory configured to store computer program code; and
    at least one processor configured to access the at least one memory and operate according to the computer program code, the computer program code including:
    determining code configured to cause at least one of the at least one processor to determine, during a process that a user accesses webpages, a hierarchy level of each webpage that is accessed by the user among a plurality of webpages in a website by parsing text of a uniform resource locator (URL), and determining a historical access number of times that the user has accessed the webpage;
    obtaining code configured to cause at least one of the at least one processor to determine, during the process that a user accesses the webpages, as an initial entropy value of each webpage accessed by the user, a preset N-level initial entropy value according to the determined hierarchy level of the webpage, where an N-level initial entropy value is greater than an (N+1)-level initial entropy value, N being an integer greater than or equal to 1, the initial entropy value of the webpage in the website being determined based on a location of the webpage in the website that is indicated by a click depth of the user in the web site;
    calculation code configured to cause at least one of the at least one processor to calculate, for each webpage, an information entropy value of the webpage by multiplying the historical access number of times that the user has accessed each webpage with the initial entropy value of the webpage;

comparing code configured to cause at least one of the at least one processor to compare the information entropy value of each webpage with a preset threshold value;

caching code configured to cause at least one of the at least one processor to cache historical access records of webpages whose information entropy values are greater than the preset threshold value, and delete historical access records of webpages whose information entropy values are not greater than the preset threshold value from a cache of the user device; and fallback code configured to cause at least one of the at least one processor to perform a fallback operation to navigate through the website to a webpage whose information entropy value is greater than the preset threshold value from a webpage whose information entropy value is not greater than the preset threshold value in a single process.

5. The apparatus of claim 4, wherein the historical access records are cached upon a condition that a number of webpages accessed by the user reaches a preset number.

6. The apparatus of claim 4, wherein the historical access records are cached upon a condition that a cache of webpages accessed by the user reaches a preset capacity.

7. A non-transitory computer-readable storage medium comprising computer program code which, when executed by at least one processor, performs operations comprising:

determining, during a process that a user accesses webpages, a hierarchy level of the webpage that is accessed by the user among a plurality of webpages in a website by parsing text of a uniform resource locator (URL), and determining historical access number of times that the user has accessed the webpage;

obtaining, during the process that the user accesses the webpages, as an initial entropy value of each webpage accessed by a the user, a preset N-level initial entropy value according to the determined hierarchy level of the webpage, where an N-level initial entropy value is greater than an (N+1)-level initial entropy value, N being an integer greater than or equal to 1, the initial entropy value of the webpage in the website being determined based on a location of the webpage in the website that is indicated by a click depth of the user in the website;

calculating, for each webpage, an information entropy value of the webpage by multiplying the historical access number of times that the user has accessed each webpage with the initial entropy value of the webpage;

determining whether a number of webpages accessed by the user reaches a preset number or a cache of the webpages accessed by the user reaches a preset capacity;

if the number of the webpages accessed by the user reaches the preset number or the cache of the webpages accessed by the user reaches the preset capacity, keeping access records of webpages whose information entropy values are greater than a preset threshold value;

if the number of the webpages accessed by the user does not reach the preset number and the cache of the webpages accessed by the user does not reach the preset capacity, keeping all access records of the webpages accessed by the user; and performing a fallback operation to navigate through the website to a webpage whose information entropy value is greater than the preset threshold value from a webpage whose information entropy value is not greater than the preset threshold value in a single process.

* * * * *